United States Patent
Murakami

(10) Patent No.: US 7,483,169 B2
(45) Date of Patent: Jan. 27, 2009

(54) IMAGE PROCESSING DEVICE, IMAGE PROCESSING METHOD, IMAGE CREATING DEVICE, COMPUTER SOFTWARE AND RECORD MEDIUM

(75) Inventor: Yoshinori Murakami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 624 days.

(21) Appl. No.: 10/555,741

(22) PCT Filed: Apr. 15, 2004

(86) PCT No.: PCT/JP2004/005409

§ 371 (c)(1),
(2), (4) Date: Nov. 7, 2005

(87) PCT Pub. No.: WO2004/100528

PCT Pub. Date: Nov. 18, 2004

(65) Prior Publication Data

US 2006/0274374 A1 Dec. 7, 2006

(30) Foreign Application Priority Data

| May 7, 2003 | (JP) | ............................. 2003-129376 |
| May 23, 2003 | (JP) | ............................. 2003-146236 |

(51) Int. Cl.
*H04N 1/60* (2006.01)
*H04N 1/405* (2006.01)
*G06K 15/02* (2006.01)
*H04N 1/40* (2006.01)
*H04N 1/52* (2006.01)

(52) U.S. Cl. ..................... 358/1.9; 358/3.03; 358/3.04; 358/3.05; 358/3.06; 358/534; 358/535; 358/536; 382/252; 382/162

(58) Field of Classification Search ................ 358/3.01, 358/3.02, 3.03, 3.04, 3.05, 3.06, 1.9, 534, 358/535, 536; 382/252, 162
See application file for complete search history.

(56) References Cited

U.S. PATENT DOCUMENTS 6,891,641 B1 * 5/2005 Kouzaki ..................... 358/3.05

(Continued)

FOREIGN PATENT DOCUMENTS

JP 4-185354 7/1992

(Continued)

OTHER PUBLICATIONS

International Search Report for PCT/JP2004/005409 dated Aug. 17, 2004.

*Primary Examiner*—Houshang Safaipour
*Assistant Examiner*—Fred Guillermety
(74) *Attorney, Agent, or Firm*—Nixon & Vanderhye, P.C.

(57) ABSTRACT

A halftone reproduction processing section (29) of an image processing apparatus (13) has a control part that conducts a halftone processing of input image data by subjecting it to an error diffusion processing, selects input image data on at most one, namely, one or no input image data from the input image data on at least seven colors, namely, primary colors of cyan, magenta, and yellow used as visible colors for forming an image on a recording medium, secondary colors of red, green, and blue that are the complementary colors of the visible colors, and black, and subjects the input image data on the other colors to a different error diffusion processing.

10 Claims, 11 Drawing Sheets

U.S. PATENT DOCUMENTS

2005/0129309 A1 * 6/2005 Kang et al. .................. 382/167

FOREIGN PATENT DOCUMENTS

| | | |
|---|---|---|
| JP | 7-274029 | 10/1995 |
| JP | 8-244254 | 9/1996 |
| JP | 10-044473 | 2/1998 |
| JP | 11-010918 | 1/1999 |

* cited by examiner

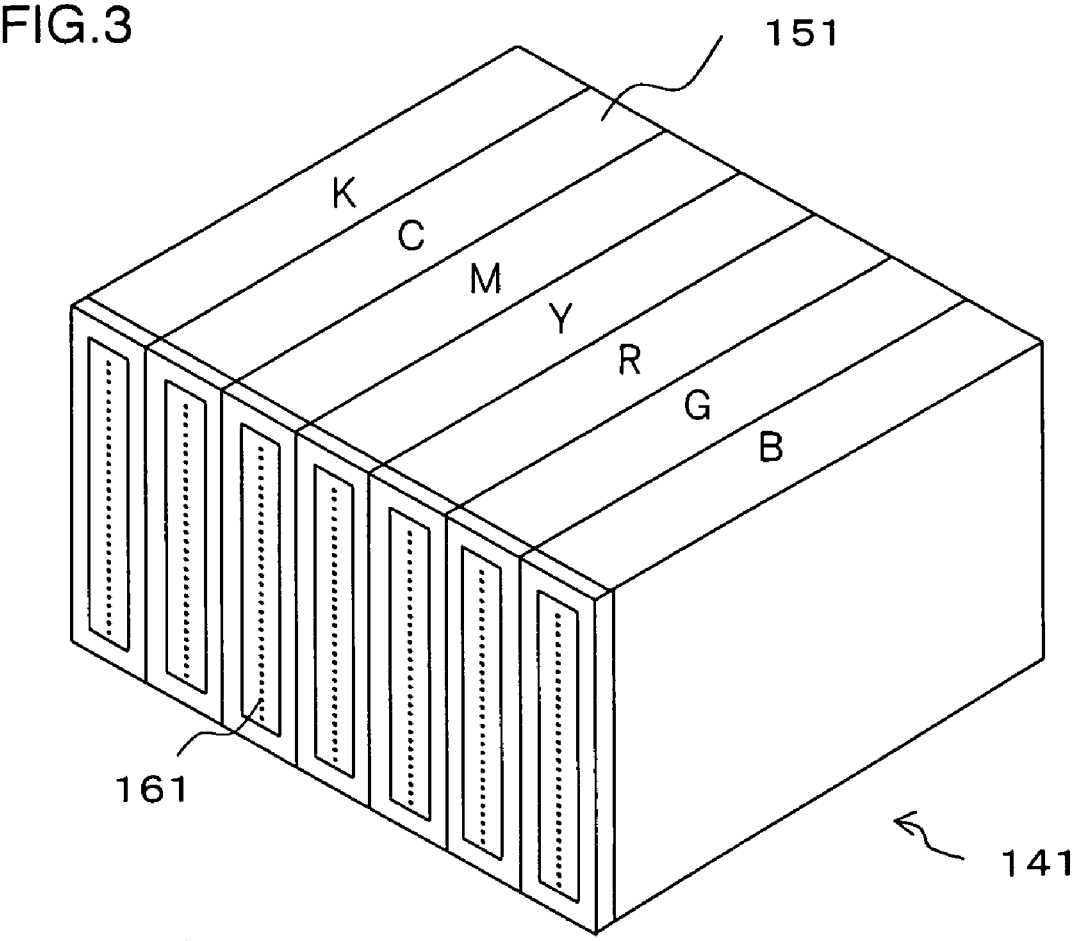

BEFORE BLACK GENERATION PROCESS

BLACK GENERATION PROCESS

AFTER BLACK GENERATION PROCESS

SECONDARY COLOR GENERATION PROCESS

AFTER SECONDARY COLOR GENERATION PROCESS

IMAGE PROCESSING DEVICE, IMAGE PROCESSING METHOD, IMAGE CREATING DEVICE, COMPUTER SOFTWARE AND RECORD MEDIUM

This application is the US national phase of international application PCT/JP2004/005409 filed 15 Apr. 2004, which designated the U.S. and claims priority to JP 2003-129376 filed 7 May 2003, and JP 2003-146236 filed 23 May 2003, the entire contents of each of which are hereby incorporated by reference.

TECHNICAL FIELD

This invention relates to an image processing apparatus, an image forming apparatus, an image processing method, a computer software including an image processing program, and a recording medium having an image processing program recorded thereon, for reproducing an image by using at least seven colors including primary colors of cyan, magenta, and yellow, secondary colors of red, green, and blue, and black, in a copier, printer, and the like.

BACKGROUND ART

In an inkjet recording device comprising a recording head for separately discharging ink for primary colors of cyan, magenta, and yellow and black in response to a recording signal based on image data, there are problems that (1) a secondary color of red, green, or blue is difficult to represent by adjusting primary colors and that (2) a good image cannot be obtained because of severe color mixing at the boundary between different secondary colors. To alleviate these problems, there is an inkjet recording device comprising a recording head for separately discharging ink for seven colors of cyan, magenta, yellow, black, red, green, and blue in response to a recording signal based on image data (see Patent Document 1).

According to the technique disclosed in Patent Document 1, ink per se can be adjusted without complex color processing, and the secondary colors of red, green, and blue are recorded with ink of red, green, and blue, respectively. This can reduce ink injection quantity and prevent the occurrence of blur at the boundary between different colors, which would otherwise cause problems especially in secondary colors.
[Patent Document 1] JP 8-244254 A

DISCLOSURE OF INVENTION

When a halftoning process (e.g., multilevel error diffusion process) is applied to color input image data to form an image on a recording medium such as paper, an image having more excellent color reproducibility and visual characteristics can be outputted by minimizing dot overlap and generating dots as uniformly as possible.

Patent Document 1 discloses a process of black generation and a process of secondary color generation from density signals of cyan, magenta, and yellow. However, depending on a subsequent method of generating data for discharging ink, that is, a method of multilevel quantization processing, there may be a pixel at which ink of a plurality of colors excessively overlaps, or conversely, a pixel at which the quantity of ink is excessively small. This is undesirable in view of color reproducibility.

An object of the invention is to provide an image processing apparatus, an image forming apparatus, an image processing method, an image processing program, and a recording medium having an image processing program recorded thereon, capable of outputting an image having excellent color reproducibility and visual characteristics without excessively overlapping ink of seven colors of cyan, magenta, yellow, black, red, green, and blue for each pixel.

An image processing apparatus of the invention comprises a tone reproduction section for applying an error diffusion process to input image data to perform a halftoning process, wherein the tone reproduction section includes a control part that selects input image data of at most one, namely, not more than one color from the input image data of at least seven colors and that applies a different error diffusion process to input image data of the other colors, the at least seven colors including primary colors used as visible colors for forming an image on a recording medium, secondary colors that are complementary colors of the visible colors, and black.

According to the image processing apparatus of the invention, output image data can be generated with avoiding dot overlap.

An image processing apparatus of the invention comprises a control part that selects input image data having the largest density value among the input image data of the seven colors.

According to the image processing apparatus of the invention, a dot having the densest color among the seven colors can be outputted for each pixel, and accumulation of errors can be minimized.

An image processing apparatus of the invention comprises a tone reproduction section for applying an error diffusion process to input image data to perform a halftoning process. The error diffusion process uses a threshold being set to not less than a half of the maximum density value that can be capable of the input image data when the tone reproduction section performs the error diffusion process on the input image data of at least seven colors including primary colors used as visible colors for forming an image on a recording medium, secondary colors that are complementary colors of the visible colors, and black.

According to the image processing apparatus of the invention, a process of comparing the image data of seven colors to determine a color having the maximum value can be eliminated by setting a threshold in order to select at most one, namely, not more than one color for the dot to be outputted among the image data of the seven colors for each pixel. The number of colors outputted for the image data for the dot outputted by the error diffusion process can thus be limited to not more than one color.

An image processing apparatus of the invention comprises a tone reproduction section for applying a multilevel error diffusion process to input image data to perform a halftoning process, wherein the tone reproduction section includes a control part for performing control so as to quantize the input image data of at least seven colors by the multilevel error diffusion process, to select input image data of at most one color from the quantized values in accordance with a summation value of the input image data of the at least seven colors, and to forcedly adjust the selected input image data by one level to diffuse quantization error, the at least seven colors including primary colors used as visible colors for forming an image on a recording medium, secondary colors that are complementary colors of the visible colors, and black.

According to the image processing apparatus of the invention, quantized values obtained by the multilevel error diffusion process are adjusted so that input image data of at most one color is selected from the quantized values in accordance with a summation value of the input image data of at least seven colors, and the selected input image data is forcedly adjusted by one level to diffuse quantization error. Therefore image data can be outputted with avoiding excessively large amount of dot discharge and overlap. Moreover, image data can be outputted with avoiding excessively small amount of dot discharge.

An image processing apparatus of the invention is characterized in that the control part selects the color having the largest quantization error and forcedly increases the quantized value of the selected color by one level when the summation value of the input image data of the at least seven colors is larger than a value that is one level above the total quantized values, and that the control part selects the color having the smallest quantization error, that is, having the negatively largest absolute value and forcedly decreases the quantized value of the selected color by one level when the summation value of the input image data of the at least seven colors is smaller than a value that is one level below the total quantized values.

According to the image processing apparatus of the invention, the color having the largest quantization error is selected and the quantized value of the selected color is forcedly increased by one level when the summation value of the input image data of the at least seven colors is larger than a value that is one level above the total quantized values, and the color having the smallest quantization error, that is, having the negatively largest absolute value is selected and the quantized value of the selected color is forcedly decreased by one level when the summation value of the input image data of the at least seven colors is smaller than a value that is one level below the total quantized values. Therefore image data more suitable to the input data can be outputted while avoiding excessively large amount of dot discharge and overlap. Moreover, image data more suitable to the input data can be outputted while avoiding excessively small amount of dot discharge.

An image forming apparatus of the invention comprises the above-described image processing apparatus.

According to the invention, excessively large amount of dot discharge and overlap, and excessively small amount of dot discharge can be avoided. Therefore an image forming apparatus can be provided that can output an image having good quality.

An image processing method of the invention comprises a tone reproduction step of applying an error diffusion process to input image data to perform a halftoning process, wherein the tone reproduction step selects input image data of at most one color from the input image data of at least seven colors and applies a different error diffusion process to input image data of the other colors, the at least seven colors including primary colors used as visible colors for forming an image on a recording medium, secondary colors that are complementary colors of the visible colors, and black.

According to the image processing method of the invention, output image data can be generated with avoiding dot overlap.

An image processing method of the invention comprises a tone reproduction step of applying an error diffusion process to input image data to perform a halftoning process, wherein the error diffusion process uses a threshold being set to not less than a half of the maximum density value that can be capable of the input image data when the tone reproduction section performs the error diffusion process on the input image data of at least seven colors including primary colors used as visible colors for forming an image on a recording medium, secondary colors that are complementary colors of the visible colors, and black.

According to the image processing method of the invention, a process of comparing the image data of seven colors to determine a color having the maximum value can be eliminated by setting a threshold in order to select at most one color for the dot to be outputted among the image data of the seven colors for each pixel. The number of colors outputted for the image data for the dot outputted by the error diffusion process can thus be limited to not more than one color.

An image processing method of the invention comprises a tone reproduction step of applying a multilevel error diffusion process to input image data to perform a halftoning process. The tone reproduction step is characterized by performing control so as to quantize the input image data of at least seven colors by the multilevel error diffusion process, to select input image data of at most one color from the quantized values in accordance with a summation value of the input image data of the at least seven colors, and to forcedly adjust the selected input image data by one level to diffuse quantization error, the at least seven colors including primary colors used as visible colors for forming an image on a recording medium, secondary colors that are complementary colors of the visible colors, and black.

A computer software of the invention comprises a program that causes a computer to perform the above-described image processing method.

According to the invention, when an image is formed using image data of at least seven colors including primary colors of cyan, magenta, and yellow, secondary colors of red, green, and blue, and black, the computer can read and perform an image processing method of selecting at most one color from the image data and forcedly adjusting the quantized value by one level to make output image data in order to avoid excessively large amount of dot discharge and overlap and excessively small amount of dot discharge for each color. Hence the image processing method can be adapted to general purposes.

Moreover, when an image is formed using image data of at least seven colors including primary colors of cyan, magenta, and yellow, secondary colors of red, green, and blue, and black, the computer can read and perform an image processing method of selecting at most one, namely, not more than one color from the image data to make output image data, or an image processing method of selecting at most one color from the image data and forcedly adjusting the quantized value by one level to make output image data, in order to avoid dot overlap for each color. Hence the image processing method can be adapted to general purposes.

A recording medium of the invention has the above-described image processing method stored thereon so as to be executable by a computer.

According to the above configuration, a program of the image processing method can be easily supplied to a computer.

BRIEF DESCRIPTION OF DRAWINGS

FIG. 3 is a perspective view of a printhead.

BEST MODE FOR CARRYING OUT THE INVENTION

FIRST EXAMPLE

Figure 1:
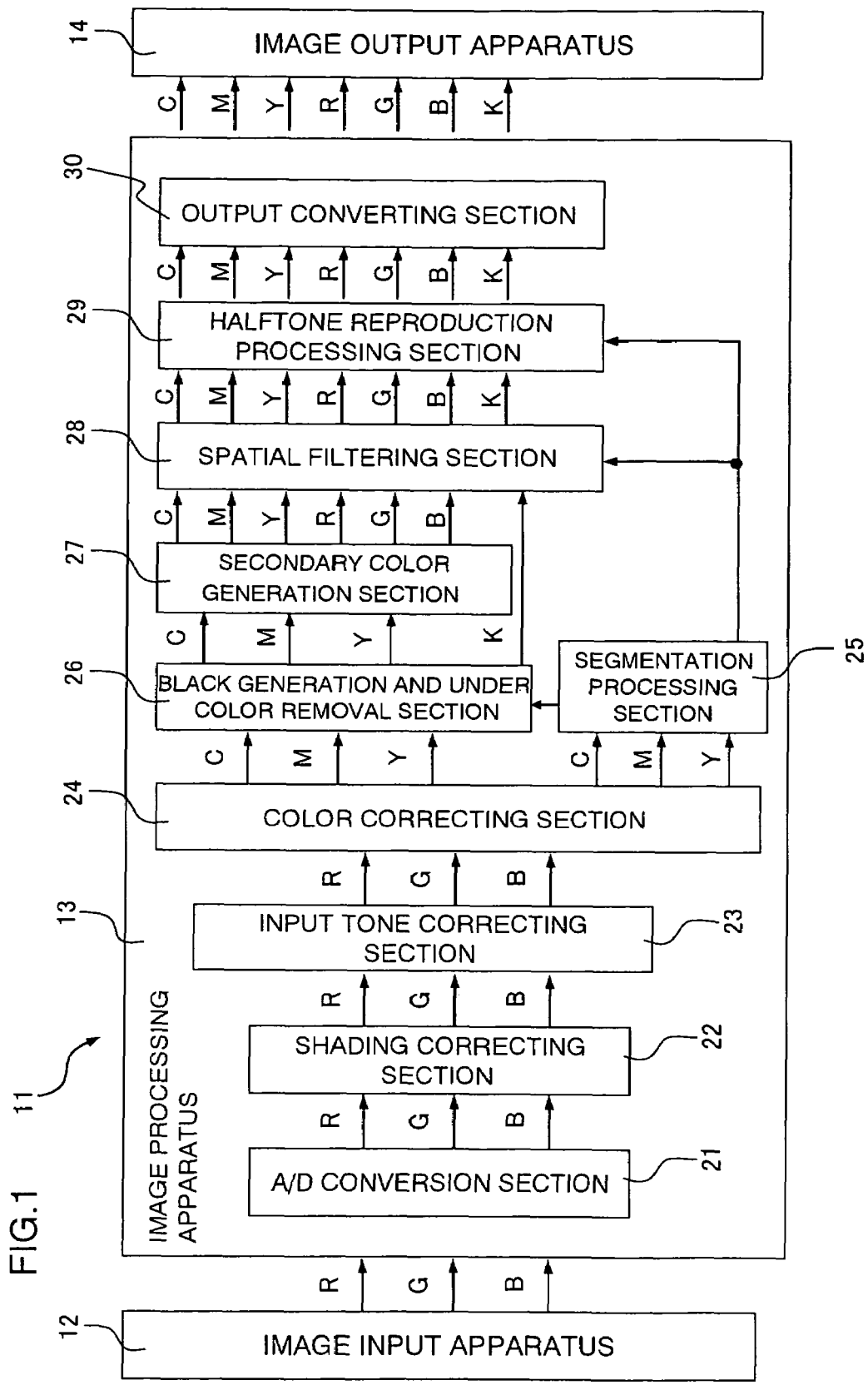
FIG. 1 is a block diagram illustrating the configuration of an image processing apparatus provided in an image forming apparatus.

FIG. 1 is a block diagram showing the configuration of an image processing apparatus 13 provided in an image forming apparatus 11 of a digital copier or an inkjet copier (which may be a multifunction machine equipped with copier, facsimile, and printer functions).

The image processing apparatus 13 is implemented by an analog-to-digital (hereinafter abbreviated as "A/D") conversion section 21, a shading correcting section 22, an input tone correcting section 23, a color correcting section 24, an segmentation processing section 25, a black generation and under color removal section 26, a secondary color generating section 27, a spatial filtering section 28, a halftone reproduction processing section (tone reproduction section) 29, and an output converting section 30. The A/D conversion section 21 converts RGB (R: red, G: green, B: blue) reflectance signals (reflectance data) provided from an image input device 12 into digital signals. The shading correcting section 22 applies a shading correction process to the A/D converted reflectance signals. The shading correction process serves to remove various distortions that may occur in the image signals due to the arrangement of illumination, image formation, and image pickup systems of the image input device 12.

The input tone correcting section 23 applies an input gradation correction process to the shading corrected reflectance signals. The input gradation correction process is a process for converting the reflectance signals into signals being tractable for the image processing apparatus 13 such as density signals. The input tone correcting section 23 may further apply a color balance process to the reflectance signals.

The color correcting section 24 converts the RGB (R: red, G: green, B: blue) density signals into CMY (C: cyan, M: magenta, Y: yellow) density signals and applies a color correction process to the CMY density signals for achieving fidelity of color reproduction in an image output device 15. Specifically, the color correction process is a process for removing, from the CMY density signals, color muddiness due to the spectral characteristics of CMY toner and ink containing unwanted absorption components.

The segmentation processing section 25 performs an area separation process based on the CMY density signals outputted from the color correcting section 24. The separated result (area identification signals) of the segmentation processing section 25 is provided to the black generation and under color removal section 26 and the spatial filtering section 28, and may be provided to the halftone reproduction processing section 29.

The black generation and under color removal section 26 performs a black generation process for generating a black (K) color signal based on the CMY color signals constituting the density signals outputted from the color correcting section 24. Moreover, the black generation and under color removal section 26 applies an undercolor removing process to the CMY color signals. The undercolor removing process is a process for subtracting the black color signal generated by the black generation process from the CMY color signals to obtain new CMY color signals. As a result of these processes, the CMY density signals are converted into an image data, which is an image signal composed of CMYK color signals.

The secondary color generating section 27 performs a secondary color generation process on two color signals among the three CMY colors outputted from the black generation and under color removal section 26. The secondary color generation process generates secondary colors from the two color signals among the three CMY colors and subtracts the secondary color signals from the two colors. The generated secondary color (complementary color of a visible color) is blue for the combination of cyan and magenta, green for the combination of cyan and yellow, or red for the combination of magenta and yellow, as described later in detail.

The spatial filtering section 28 applies a spatial filtering process using a digital filter to the CMYKRGB image data obtained by the black generation and under color removal section 26 and the secondary color generating section 27. This corrects the spatial frequency characteristics of the image, and therefore any blur or granular degradation can be avoided in the image outputted from the image output device 14.

The halftone reproduction processing section (tone reproduction section) 29 applies a gradation correction process and a halftoning process to the spatial filtered CMYK image data. The halftoning process is a process for dividing the image into a plurality of pixels to reproduce gradation and can use techniques such as two-level or multilevel dithering and error diffusion. The half tone reproduction processing section 29 may perform a process of converting the density value of the image data into a halftone dot area rate, which is a characteristic value of the image output device 14.

The output converting section 30 converts the output image data in accordance with an array of heads (C, M, Y, K, or other inkjet heads) of the inkjet recording device that serves as the image output device 14. The density signals processed by the output converting section 30 are provided to the image output device 14. The foregoing operations are controlled by a CPU (Central Processing Unit, or control part), for example.

Figure 2:
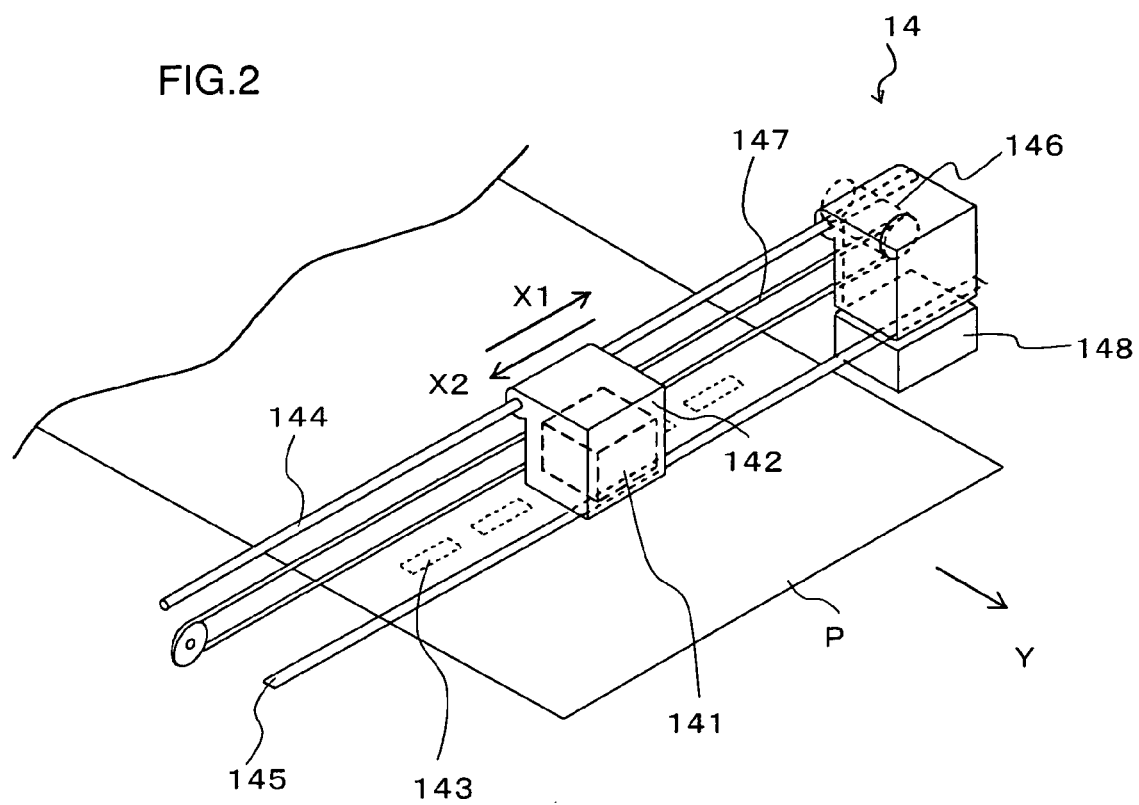
FIG. 2 is an illustration of the configuration of an inkjet recording device.

FIG. 2 is a perspective view showing the overall configuration of an inkjet recording device (copier, printer, or multifunction machine), which is an example of the image output device.

The inkjet recording (image output) device 14 is generally composed of an printhead (inkjet head) 141, a carriage 142, conveying rollers 143, a guide shaft 144, a holding means 145, a motor 146, a driving belt 147, and a maintenance unit 148. The carriage 142 has the printhead (inkjet head) 141 mounted thereon and can be moved in the main scan direction indicated by arrows X1 and X2 relative to a recording medium P. The recording medium P is fed from a feeder, not shown, in the sub-scan direction indicated by arrow Y, whereas image formation is performed by the printhead 141 moving in the direction of arrows X1 and X2. The recording media stored in the feeder are fed out one sheet at a time by a feeding roller, not shown, and supplied to the printhead 141 section by the conveying rollers 143 serving as a recording medium conveying means. The recording medium P that has finished recording is ejected to an ejector (not shown)

The printhead (inkjet head) 141 is slidably supported on the guide shaft 144 and the holding means 145 extending in the main scan direction and its position relative to the recording medium is determined. Moreover, the driving belt 147 driven by the motor 146 serving as a driving means is stretched parallel to the guide shaft 144. The printhead (inkjet head) 141 is driven and displaced by the driving belt 147.

Note that in the maintenance unit 148, maintenance such as cleaning for the printhead (inkjet head) 141 is performed.

As shown in FIG. 3, the printhead (inkjet head) 141 comprises ink tanks 151 for ink of a plurality of colors, for example, normal ink of seven colors consisting of C (cyan), M (magenta), Y (yellow), K (black), R (red), G (green), and B (blue) These kinds of ink are discharged from a nozzle 161 onto the recording medium in response to image data.

In the configuration of the image processing apparatus and image processing method according to this embodiment, an error diffusion process is used to output two-level data indicating whether the halftone output (reproduction) gradation processing section 29 discharges a dot of ink.

Reference is made to FIG. 4 to describe the processes from the black generation and undercolor removing processes to the halftone output gradation process in this embodiment. FIG. 4 illustrates an example of the processes from the black generation and undercolor removing processes to the secondary color generation process.

The black generation and under color removal section 26 performs black generation and undercolor removing processes based on the CMY color signals constituting the density signals outputted from the color correcting section 24.

Figure 4A:
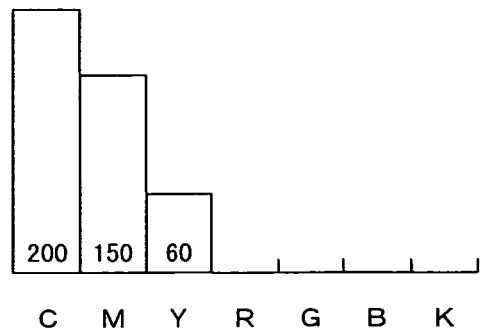
FIG. 4 is an illustration of a halftone output gradation process.
Figure 4B:
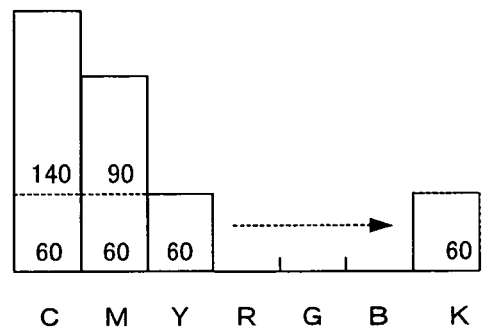
Figure 4C:
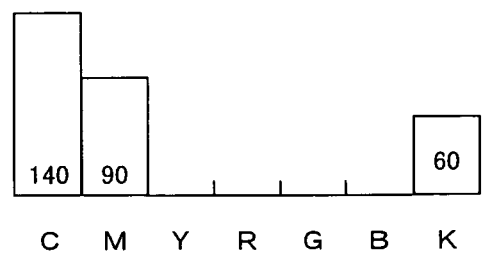

In the black generation process according to this embodiment, the minimum of the CMY color signals (FIG. 4(a)) is used directly as a black color signal, which is then subtracted from each of the CMY signals. In this way, at least one of the three CMY color density signals is set to zero. For example, if the cyan color signal is 200, the magenta color signal is 150, and the yellow color signal is 60, then as shown in FIG. 4(b), their minimum, 60, is used as a black color signal, which is subtracted from each of the CMY color signals to obtain a cyan color signal of 140, a magenta color signal of 90, and a yellow signal of 0 (FIG. 4(c)).

Figure 4D:
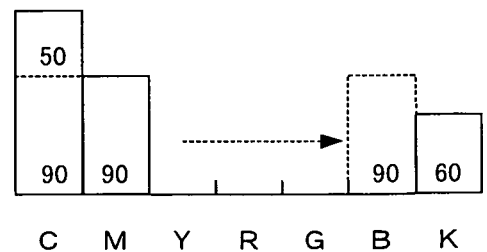
Figure 4E:
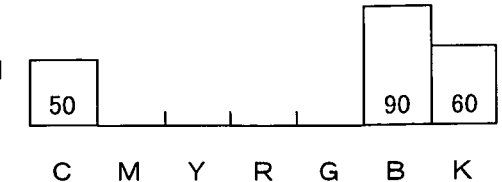

The secondary color generating section 27 performs a secondary color generation process on nonzero color signals among the three CMY colors outputted from the black generation and under color removal section 26. In the secondary color generation process according to this embodiment, the minimum of the two nonzero color signals among the three CMY color signals is used as secondary color signals, which are subtracted from the two original color signals. In this way, at least one of the two colors is set to zero. As shown in FIG. 4(d), given a cyan color signal of 140 and a magenta color signal of 90, their minimum, 90, is used as a blue signal, which is subtracted from the cyan and magenta color signals to obtain a cyan color signal of 50 and a magenta color signal of 0 (FIG. 4(e)).

The processes in the black generation and under color removal section 26 and the secondary color generating section 27 result in at most three nonzero color signals, that is, one color among the three primary colors, one color among the secondary colors, and black. After these processes, the image data of seven CMYKRGB colors is subjected to a spatial filtering process in the spatial filtering section 28.

Moreover, the halftone reproduction processing section 29 performs gradation correction and halftoning processes.

Figure 5:
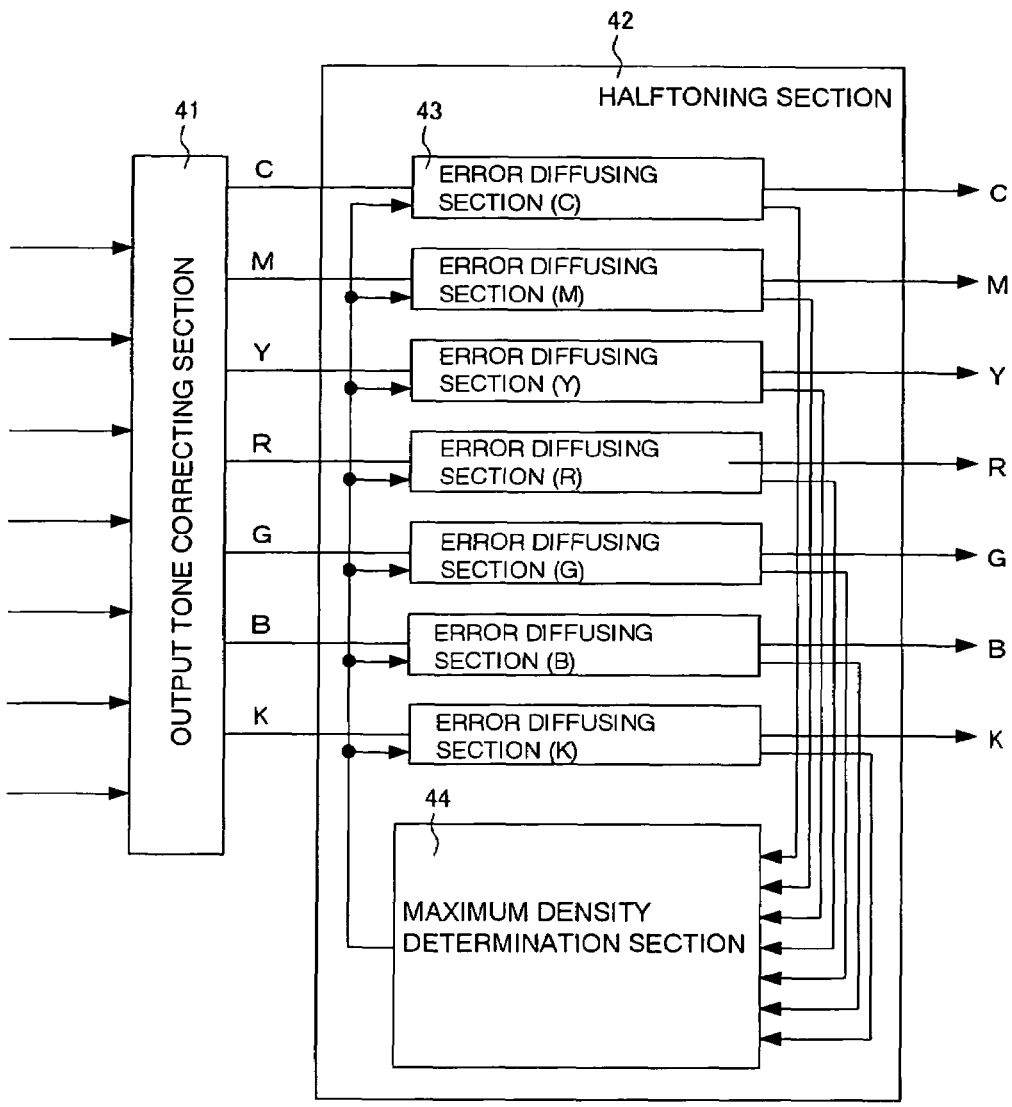
FIG. 5 is an illustration of the configuration of a halftone reproduction processing section.

The halftone reproduction processing section 29 comprises an output tone correcting section 41 and a halftoning section 42 (see FIG. 5).

The output tone correcting section 41 performs a process of converting, for each pixel, the CMYK image data into a halftone dot area rate, which is a characteristic value dependent on the output characteristics of the image output device 14.

Figure 7:
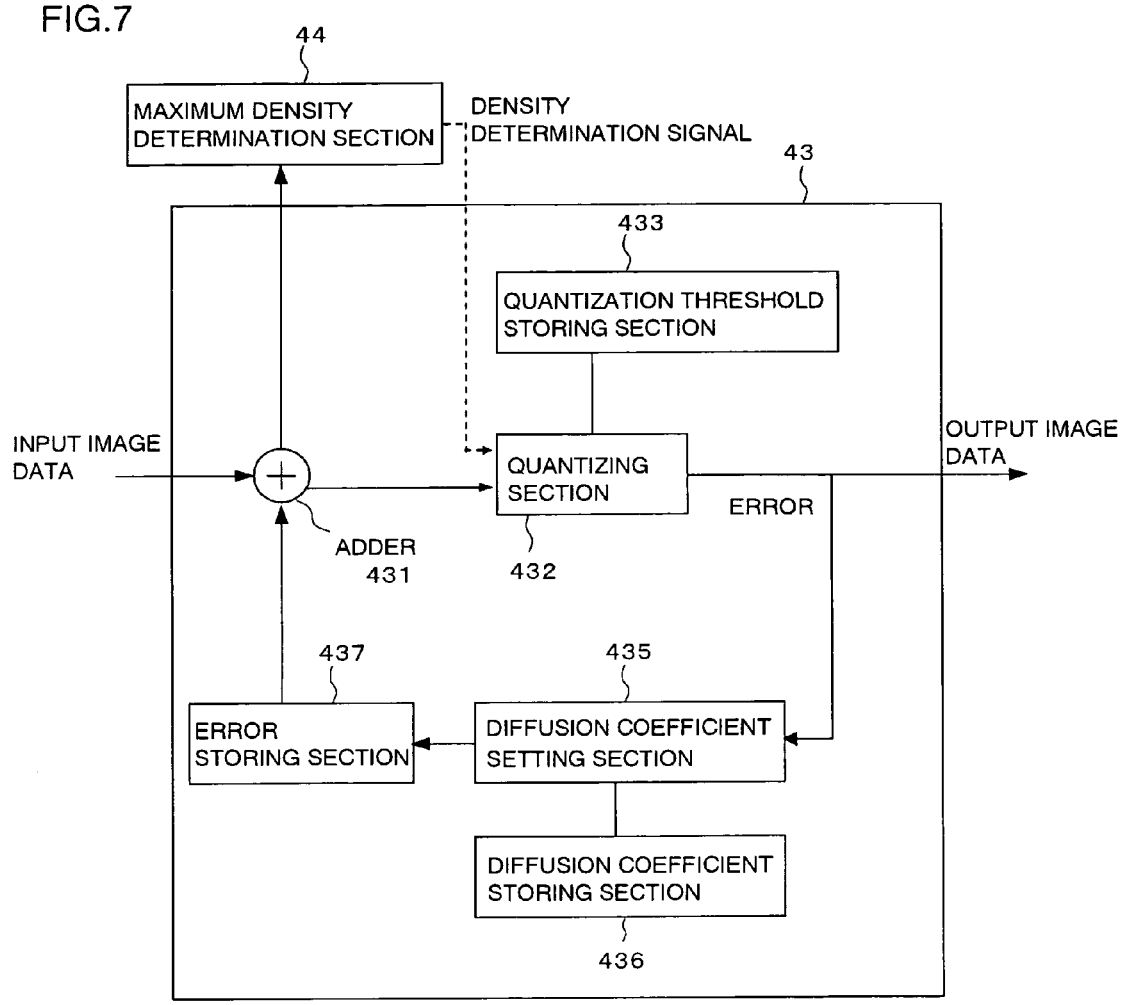
FIG. 7 is a block diagram of an error diffusion processing section.

The halftoning section 42 is now described in detail (see the block diagram of FIG. 7 for the error diffusing section 43).

The halftoning section 42 comprises error diffusing sections 43 and a maximum density determination section 44. Given a pixel of received input image data, the error diffusing section 43 uses an adder 431 to add to the pixel a diffusion error for the pixel stored in an error storing section 437, and outputs the result to a quantizing section 432. Based on a density determination signal from the maximum density determination section 44, the quantizing section 432 selects a quantization threshold stored in a quantization threshold storing section 433 and compares it with the pixel to which the diffusion error has been added, thereby performing binarization and determining an error relative to the quantized value. A diffusion coefficient setting section 435 selects a diffusion coefficient from a diffusion coefficient storing section 436 and calculates a diffusion error based on this diffusion coefficient and the above-described error. The diffusion error is then stored in the error storing section 437.

The maximum density determination section 44 determines the densest data among the CMYKRGB image data and outputs a signal (density determination signal) to the quantizing section 432 for the densest color, the signal directing that the densest color be quantized with two levels using a normal threshold and the associated error be diffused. For the other colors, a signal (density determination signal) is outputted, directing that the quantization threshold stored in the quantization threshold storing section 433 of the error diffusing section 43 be set to 255. Alternatively, a signal (density determination signal) is outputted to the quantizing section 432, directing to unconditionally set the quantized value to zero. Here the threshold of 255 is the maximum density when the image is represented with 256 levels of gradation.

Figure 6:
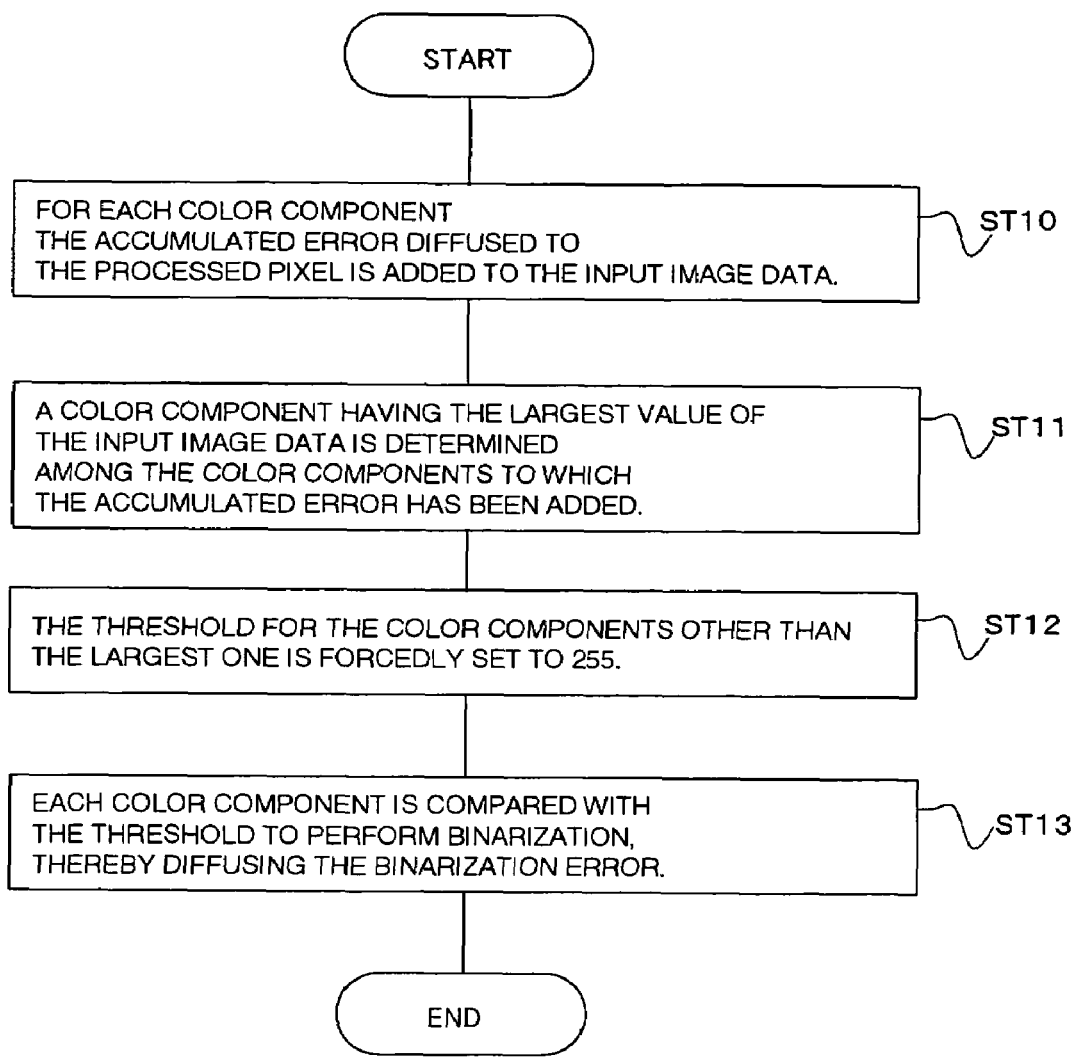
FIG. 6 is a flow chart of a halftoning process.

FIG. 6 illustrates a flow of the halftoning process in the halftoning section 42 of the halftone reproduction processing section 29 according to this embodiment. It is assumed here that the image output device forms an image by switching dot discharge on and off, that is, by using a two-level image, and a two-level error diffusion technique is used as the halftoning process.

At step ST10, for each of the CMYK color components, the accumulated error diffused to the processed pixel is added to the input image data. Then, at step ST11, a color component having the largest value is determined among the input image data of the addition result. At step ST12, the threshold for the color components other than the largest one is set to 255 and each color component is compared with the threshold (i.e., 255) to perform binarization, thereby diffusing the binarization error (step ST13).

After the secondary color generation process in the secondary color generating section 27, the nonzero image data has three colors, that is, one color among the three primary CMY colors, one color among the secondary RGB colors, and black. Therefore, after the spatial filtering process, the image data of the color components other than these three colors is also close to zero. It is thus acceptable to binarize one of these three color components having the largest image data (density value) after the spatial filtering process and to perform error diffusion based thereon. The image data for colors other than the color of the largest image data is subjected to the error diffusion process with the threshold being forcedly set to 255. Alternatively, without performing the threshold determination process, the quantized value or output value may be unconditionally set to zero to diffuse the quantization error.

In view of 255 (the maximum density for the image represented with 256 levels of gradation)/2=127.5, it is also acceptable to binarize each color using 127 (dropping the fractional portion) as a threshold of each color without examining which image data has the largest value. This is because two or more colors among the three colors are by no means 128 or higher, since the total density value of the three colors is assumed to be 255 at maximum. In this case, the maximum density determination section in FIGS. 5 and 7 is not needed.

According to the foregoing process, dots of a plurality of colors are by no means discharged on any one pixel. Therefore degradation of reproducibility can be restrained and a visually desirable image can be obtained.

According to the invention, a program capable of performing this image processing method may be generated and stored on a recording medium such as a hard disk, flexible disk, or CD-ROM. The above-described configuration enables an image forming apparatus or computer to be easily supplied with the above recording medium and to perform this image processing method.

This program can be applied to a computer as a software, for example. Alternatively, a printer driver including the program may be installed on a computer.

Figure 8:
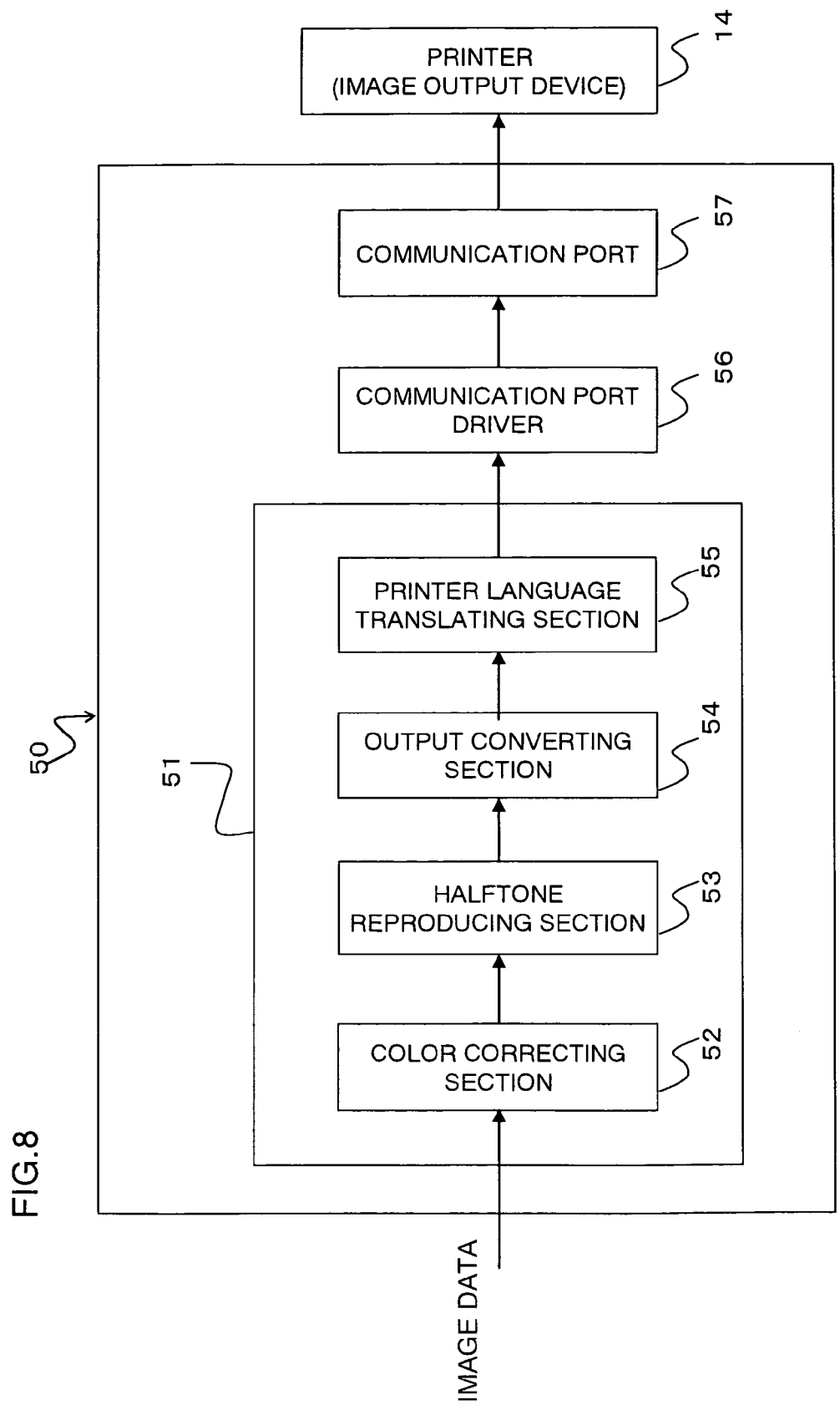
FIG. 8 is a block diagram illustrating the configuration of a printer driver provided in a computer.

FIG. 8 is a block diagram illustrating the configuration of a printer driver provided in a computer. The computer 50 comprises a printer driver 51, a communication port driver 56, and a communication port 57. The printer driver 51 comprises a color correcting section 52, a halftone reproducing section 53, an output converting section 54, and a printer language translating section 55. The computer 50 is connected to an inkjet printer (image output device) 14 via the communication port driver 56 and the communication port 57 for RS232C, LAN, or the like.

In the computer 50, an image data generated by executing various application programs is passed to the color correcting section 52 in the printer driver 51. The color correcting section 52 applies a process to the image data, the process being similar to that of the color correcting section provided in the above-described color image processing apparatus. The color correcting section 52 also performs the same processes as those in the black generation and under color removal section and the secondary color generating section of the color image processing apparatus. The image data outputted from the color correcting section 52 is then passed to the halftone reproducing section 53 where gradation correction and halftoning processes are applied. After being subjected to the processes in the halftone reproducing section 53, the image data is passed to the output converting section 54. The output converting section 54 converts the output image data in accordance with an array of heads (C, M, Y, K, or other inkjet heads) of the printer 14 and passes it to the printer language translating section 55 where it is converted into the printer language. The image data outputted from the printer language translating section 55 is inputted to the printer 14 via the communication port driver 56 and the communication port 57. The printer 14 outputs the received image data onto a recording medium such as paper.

The program and recording medium according to the invention can be provided as a printer driver as described above to be added to the existing computer, printer, and the like. This enables to easily implement the image processing method of the invention.

SECOND EXAMPLE

The image processing apparatus and image processing method according to this example is characterized by a halftone reproduction processing section that outputs a multilevel data indicating ink dot discharge quantity using a multilevel error diffusion process.

In this example, a gradation correcting process converts, for each pixel, the CMYK image data into a halftone dot area rate, which is a characteristic value dependent on the output characteristics of the image output device 14.

Figure 9:
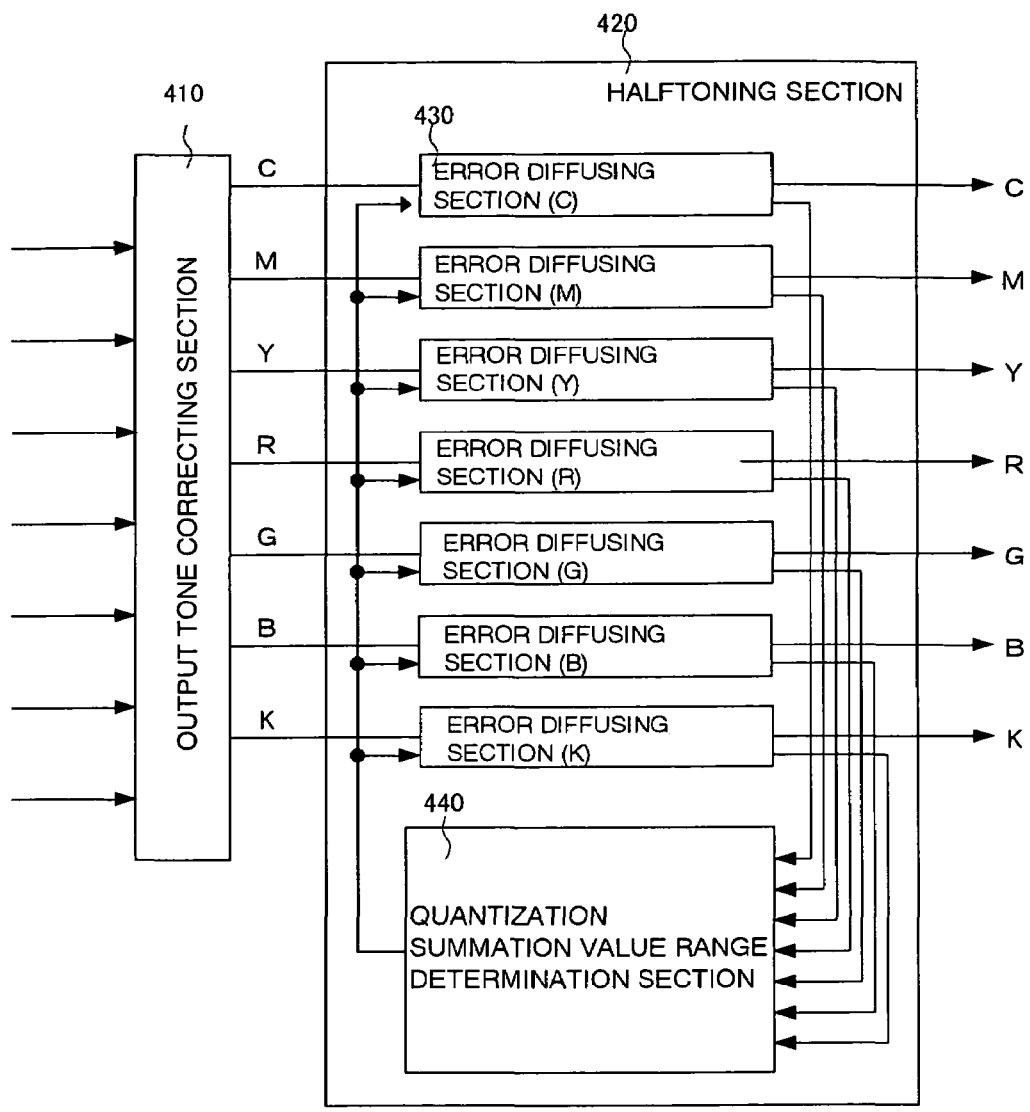
FIG. 9 is an illustration of the configuration of a halftone reproduction processing section.

The halftone reproduction processing section comprises an output tone correcting section 410 and a halftoning section 420 (see FIG. 9).

The halftoning section 420 comprises error diffusing sections 430 and a quantization summation value range determination section 440.

Figure 11:
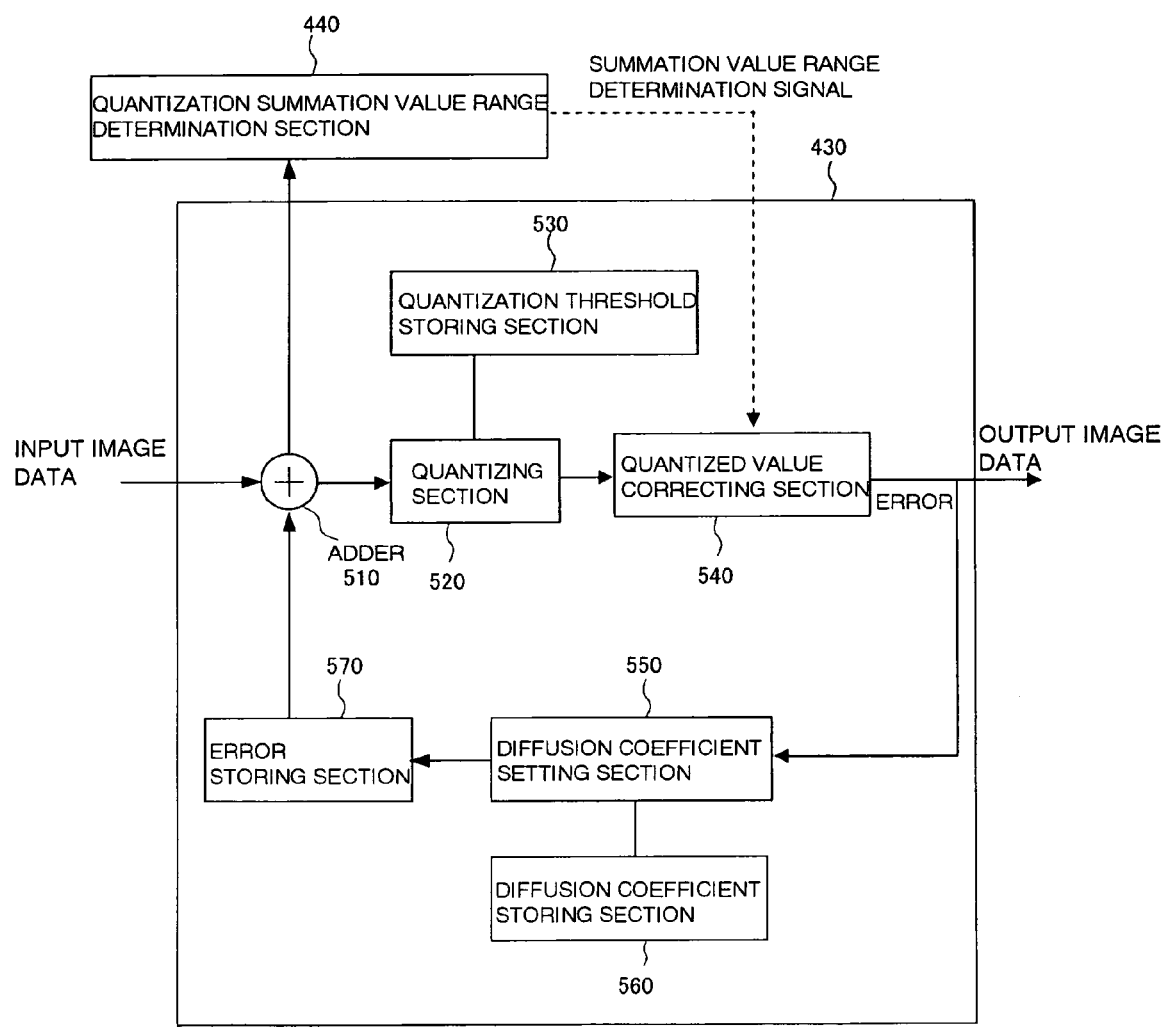
FIG. 11 is a block diagram of an error diffusion processing section.

Referring to the block diagram shown in FIG. 11, the configuration of the error diffusing section 430 is described.

Given a pixel of received input image data, the error diffusing sections 430 uses an adder 510 to add to the pixel a diffusion error for the pixel stored in an error storing section 570, and outputs the result to a quantizing section 520. The quantizing section 520 selects a set of three quantization thresholds (described later) stored in a quantization threshold storing section 530 and compares it with the image data of the pixel to which the diffusion error has been added, thereby performing four-level quantization and determining an error relative to the quantized value.

A quantized value correcting section (control part) 540 determines a summation value of the quantized values for the color components or a summation value of the output data indicating dot discharge quantity and compares it with a summation value range determination signal. The summation value range determination signal is outputted from the quantization summation value range determination section 440 that determines the range of the summation value of the output data as described later.

When the summation value of the quantized values for the color components or the summation value of the output data indicating dot discharge quantity is larger than the range value indicated by the summation value range determination signal, the quantized value correcting section (control part) forcedly decreases the quantized value of the color component having the negatively largest absolute value of the quantization error by one level and redetermines the quantization error.

When the summation value of the quantized values for the color components or the summation value of the output data indicating dot discharge quantity is smaller than the range value indicated by the summation value range determination signal, the quantized value correcting section (control part) 540 forcedly increases the quantized value of the color component having the largest quantization error by one level and redetermines the quantization error.

When the summation value of the quantized values for the color components or the summation value of the output data indicating dot discharge quantity matches the range indicated by the summation value range determination signal, no correction of the quantized values is performed. This process will be described later in detail.

A diffusion coefficient setting section 550 selects a diffusion coefficient from a diffusion coefficient storing section 560, calculates a diffusion error based on this diffusion coefficient and the above-described error, and stores the diffusion error in the error storing section 570.

In order to prevent excessively large amount of dot discharge and overlap or excessively small amount of dot discharge for the density indicated by the input image data, the quantization summation value range determination section 440 determines a summation value of the CMYKRGB image data, and in accordance with the summation value, determines the range of the summation value of the quantized values for the color components or the summation value of the output data indicating total dot discharge quantity. In this example, it is assumed that the image output device can adjust the quantity of dot discharge from a nozzle 161 shown in FIG. 3 in four levels. In other words, the image is formed with multiple levels and a four-level error diffusion technique is used as the halftoning process. Quantized values for image data 0, 1, 2, and 3 indicating dot discharge quantity are set to 0, 85, 170, and 255, respectively.

The summation value range determination signal is outputted as a signal directing that the summation value of the quantized values for the color components be adjusted to 0 or 85 or the summation value of the image data indicating dot discharge quantity be adjusted to 0 or 1 when the summation value of the CMYKRGB image data is not more than 85, the summation value of the quantized values for the color components be adjusted to 85 or 170 or the summation value of the image data indicating dot discharge quantity be adjusted to 1 or 2 when the summation value of the CMYKRGB image data is not less than 86 and not more than 170, and the summation value of the quantized values for the color components be adjusted to 170 or 255 or the summation value of the image data indicating dot discharge quantity be adjusted to 2 or 3 when the summation value of the CMYKRGB image data is not less than 171.

Figure 10:
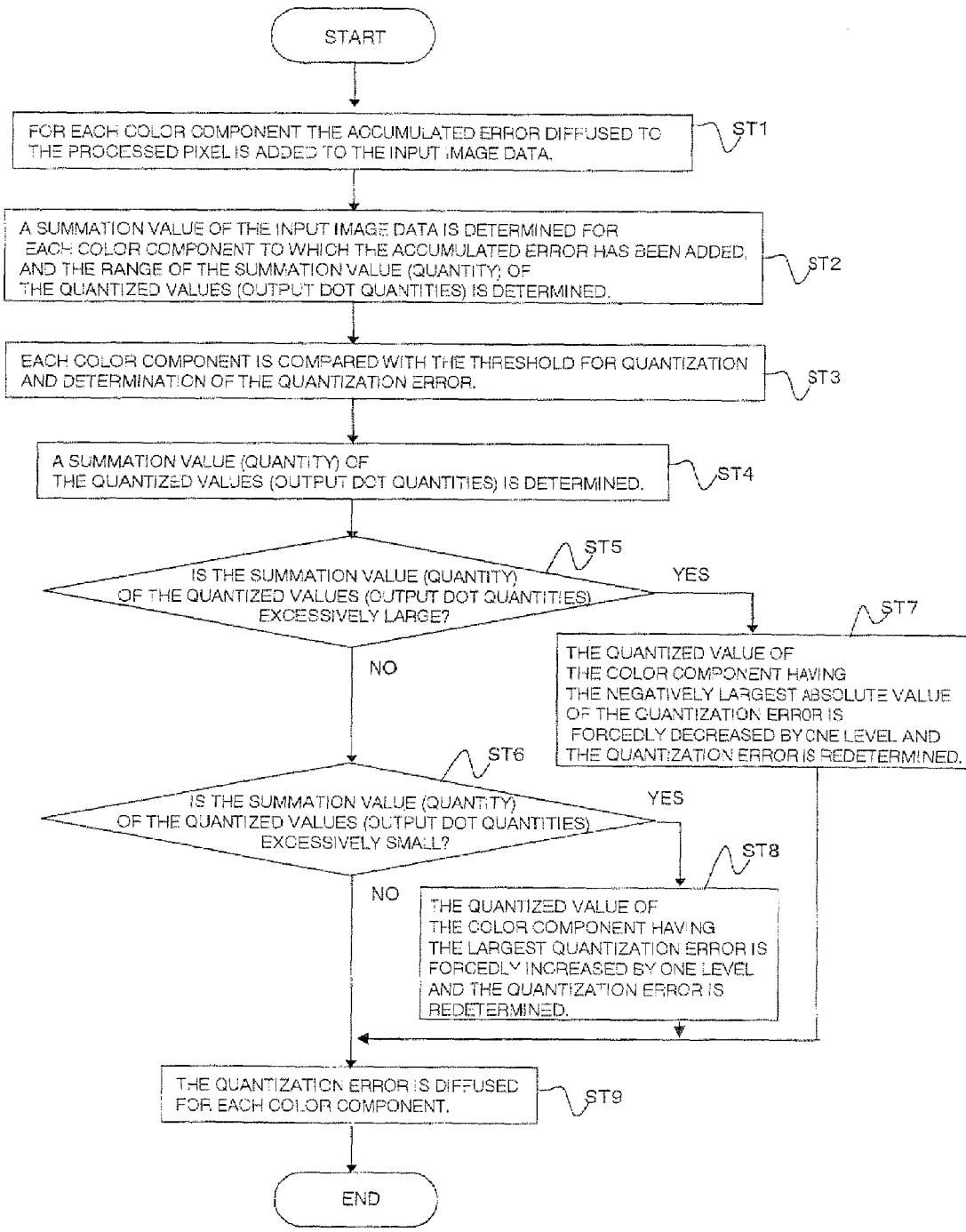
FIG. 10 is a flow chart of a halftoning process.

Referring now to the flow chart shown in FIG. 10, a flow of the halftoning process according to this embodiment is described.

For each color component inputted to the error diffusing section 430, a diffusion error stored in the error storing section 570 is added to each processed pixel by the adder 510 (step ST1). A summation value of the input image data is determined for the color component to which the accumulated error has been added, and the range of the summation quantity of the quantized values (output dot quantities from the nozzle) is determined (step ST2)

At step ST3, a set of three quantization thresholds (described later) stored in the quantization threshold storing section 530 is selected, the image data of the pixel to which the diffusion error has been added is compared with the quantization thresholds to determine quantized values, and an error between the image data and the quantized value is determined. At step ST4, a summation value of the quantized values (output dot quantities) for the color components is determined.

At step ST5, it is determined whether the summation value of the quantized values (output dot quantities) is larger than the summation value range determination signal. When the summation value of the quantized values for the color components or the summation value of the output data indicating dot discharge quantity is larger than the range value indicated by the summation value range determination signal, control proceeds to step ST7, where the quantized value of the color component having the negatively largest absolute value of the quantization error is forcedly decreased by one level and the quantization error is redetermined.

When the summation value of the quantized values for the color components or the summation value of the output data indicating dot discharge quantity is not larger than the range value indicated by the summation value range determination signal, control proceeds to step ST6, where it is determined whether the summation value of the quantized values (output dot quantities) is smaller than the summation value range determination signal. When the summation value of the quantized values for the color components or the summation value of the output data indicating dot discharge quantity is smaller than the range value indicated by the summation value range determination signal, control proceeds to step ST8, where the quantized value of the color component having the largest quantization error is forcedly increased by one level and the quantization error is redetermined. When the summation value of the quantized values for the color components or the summation value of the output data indicating dot discharge quantity is not smaller than the range value indicated by the summation value range determination signal, control proceeds to step ST9, where the diffusion error for each color component is stored in the error storing section 570.

Assuming here that the quantization thresholds stored in the quantization threshold storing section 530 are 42, 127, and 212, the quantization process and the subsequent correction of quantized values in response to the summation value range determination signal will proceed as follows.

In the image data of the pixel to which the diffusion error has been added, assume that the cyan color signal is 50, the magenta color signal is 0, the yellow signal is 0, the red color signal is 0, the green color signal is 0, the blue color signal is 90, and the black color signal is 60. The summation value of the CMYKRGB image data is then 200, which is not less than 171. Therefore the quantization summation value range determination section 440 outputs a summation value range determination signal directing that the summation value of the quantized values for the color components be 170 or 255, that is, the summation value of the image data indicating dot discharge quantity be 2 or 3. After the quantization process is applied, the quantized value of cyan is 85 (dot discharge quantity of 1), the quantized value of magenta is 0 (dot discharge quantity of 0), the quantized value of yellow is 0 (dot discharge quantity of 0), the quantized value of red is 0 (dot discharge quantity of 0), the quantized value of green is 0 (dot discharge quantity of 0), the quantized value of blue is 85 (dot discharge quantity of 1), and the quantized value of black is 85 (dot discharge quantity of 1). The summation value of the quantized values for the color components is 255 (the summation value of the image data indicating dot discharge quantity is 3), which is within the summation value range indicated by the summation value range determination signal of the quantization summation value range determination section 440. In this case, therefore, no correction of the quantized values is performed for any of the color components, and the quantization error is directly diffused.

In the image data of the pixel to which the diffusion error has been added, assume that the cyan color signal is 135, the magenta color signal is 0, the yellow signal is 0, the red color signal is 0, the green color signal is 0, the blue color signal is 45, and the black color signal is 60. The summation value of the CMYKRGB image data is then 240, which is not less than 171. Therefore the quantization summation value range determination section 440 outputs a summation value range determination signal directing that the summation value of the quantized values for the color components be 170 or 255, that is, the summation value of the image data indicating dot discharge quantity be 2 or 3. After the quantization process is applied, the quantized value of cyan is 170 (dot discharge quantity of 2), the quantized value of magenta is 0 (dot discharge quantity of 0), the quantized value of yellow is 0 (dot discharge quantity of 0), the quantized value of red is 0 (dot discharge quantity of 0), the quantized value of green is 0 (dot discharge quantity of 0), the quantized value of blue is 85 (dot discharge quantity of 1), and the quantized value of black is 85 (dot discharge quantity of 1). The summation value of the quantized values for the color components is 340 (the summation value of the image data indicating dot discharge quantity is 4), which exceeds the summation value range of 2 or 3 indicated by the summation value range determination signal of the quantization summation value range determination section 440. In this case, it is examined which of the color components has the negatively largest absolute value of the quantization error. The quantization error of cyan is −35, the quantization error of magenta is 0, the quantization error of yellow is 0, the quantization error of red is 0, the quantization error of green is 0, the quantization error of blue is −40, and the quantization error of black is −25. The quantization error of blue has the negatively largest absolute value. Hence the quantized value of blue is decreased by one level (the dot discharge quantity is decreased by one) to 0 (dot discharge quantity of 0), which results in the quantization error of blue being 45. Subsequently, the quantization error is diffused for each color component.

In the image data of the pixel to which the diffusion error has been added, assume that the cyan color signal is 0, the magenta color signal is 30, the yellow signal is 5, the red color signal is 25, the green color signal is 0, the blue color signal is 0, and the black color signal is 40. The summation value of the CMYKRGB image data is then 100, which is not less than 86 and not more than 170. Therefore the quantization summation value range determination section 440 outputs a summation value range determination signal directing that the summation value of the quantized values for the color components be 85 or 170, that is, the summation value of the image data indicating dot discharge quantity be 1 or 2. After the quantization process is applied, the quantized value of cyan is 0 (dot discharge quantity of 0), the quantized value of magenta is 0 (dot discharge quantity of 0), the quantized value of yellow is 0 (dot discharge quantity of 0), the quantized value of red is 0 (dot discharge quantity of 0), the quantized value of green is 0 (dot discharge quantity of 0), the quantized value of blue is 0 (dot discharge quantity of 0), and the quantized value of black is 0 (dot discharge quantity of 0). The summation value of the quantized values for the color components is 0 (the summation value of the image data indicating dot discharge quantity is 0), which is smaller than the summation value range of 1 or 2 indicated by the summation value range determination signal of the quantization summation value range determination section 440. In this case, it is examined which of the color components has the largest quantization error. The quantization error of cyan is 0, the quantization error of magenta is 30, the quantization error of yellow is 5, the quantization error of red is 25, the quantization error of green is 0, the quantization error of blue is 0, and the quantization error of black is 40. The quantization error of black is the largest. Hence the quantized value of black is increased by one level (the dot discharge quantity is increased by one) to 85 (dot discharge quantity of 1), which results in the quantization error of black being −45. Subsequently, the quantization error is diffused for each color component.

According to the foregoing process, excessively large amount of dot discharge and overlap can be eliminated, and conversely, excessively small amount of dot discharge can be prevented. Therefore degradation of reproducibility can be restrained and a visually desirable image can be obtained.

According to the invention, a program capable of performing this image processing method may be generated and stored on a recording medium such as a hard disk, FD, or CD-ROM. The above-described configuration enables an image forming apparatus or computer to be easily supplied with the above recording medium and to perform this image processing method.

This program can be applied to a computer as a software, for example. Alternatively, a printer driver including the program may be installed on a computer.

The printer driver provided in a computer is as described in the first example.

The program and recording medium according to the invention can be provided as a printer driver as described above to be added to the existing computer, printer, and the like. This enables to easily implement the image processing method of the invention.

While a digital color copier and a printer are illustrated as the image output device in this embodiment, the image output device may alternatively be a digital multifunction machine having printer, copier, and facsimile functions.

INDUSTRIAL APPLICABILITY

The invention enables to form an image having excellent color reproducibility and visual characteristics without overlapping ink of seven colors of cyan, magenta, yellow, black, red, green, and blue for each pixel.

Moreover, the invention can prevent excessive dot overlapping, or conversely, dot missing, thereby restraining degradation of image quality.

The invention claimed is:

1. An image processing apparatus comprising a tone reproduction section for applying an error diffusion process to input image data to perform a halftoning process, wherein
the tone reproduction section includes a control part that selects input image data of at most one color from the input image data of at least seven colors and that applies a different error diffusion process to input image data of the other colors, the at least seven colors including primary colors used as visible colors for forming an image on a recording medium, secondary colors that are complementary colors of the visible colors, and black.

2. An image processing apparatus according to claim 1, wherein the control part selects input image data having the largest density value among the input image data of the seven colors.

3. An image processing apparatus comprising a tone reproduction section for applying an error diffusion process to input image data to perform a halftoning process, wherein
the error diffusion process uses a threshold being set to not less than a half of the maximum density value that can be capable of the input image data when the tone reproduction section performs the error diffusion process on the input image data of at least seven colors including primary colors used as visible colors for forming an image on a recording medium, secondary colors that are complementary colors of the visible colors, and black.

4. An image processing apparatus comprising a tone reproduction section for applying a multilevel error diffusion process to input image data to perform a halftoning process, wherein
the tone reproduction section includes a control part for performing control so as to quantize the input image data of at least seven colors by the multilevel error diffusion process, to select input image data of at most one color from the quantized values in accordance with a summation value of the input image data of the at least seven colors, and to forcedly adjust the selected input image data by one level to diffuse quantization error, the at least seven colors including primary colors used as visible colors for forming an image on a recording medium, secondary colors that are complementary colors of the visible colors, and black.

5. An image processing apparatus according to claim 4, wherein the control part performs control so that the control part selects the color having the largest quantization error and forcedly increases the quantized value of the selected color by one level when the summation value of the input image data of the at least seven colors is larger than a value that is one level above the total quantized values, and that the control part selects the color having the smallest quantization error (having the negatively largest absolute value) and forcedly decreases the quantized value of the selected color by one level when the summation value of the input image data of the at least seven colors is smaller than a value that is one level below the total quantized values.

6. An image forming apparatus comprising an image processing apparatus according to claim 1.

7. An image processing method comprising a tone reproduction step of applying an error diffusion process to input image data to perform a halftoning process, wherein the tone reproduction step selects input image data of at most one color from the input image data of at least seven colors and applies a different error diffusion process to input image data of the other colors, the at least seven colors including primary colors used as visible colors for forming an image on a recording medium, secondary colors that are complementary colors of the visible colors, and black.

8. An image processing method comprising a tone reproduction step of applying an error diffusion process to input image data to perform a halftoning process, wherein the error diffusion process uses a threshold being set to not less than a half of the maximum density value that can be capable of the input image data when the tone reproduction section performs the error diffusion process on the input image data of at least seven colors including primary colors used as visible colors for forming an image on a recording medium, secondary colors that are complementary colors of the visible colors, and black.

9. An image processing method comprising a tone reproduction step of applying a multilevel error diffusion process to input image data to perform a halftoning process, wherein the tone reproduction step performs control so as to quantize the input image data of at least seven colors by the multilevel error diffusion process, to select input image data of at most one color from the quantized values in accordance with a summation value of the input image data of the at least seven colors, and to forcedly adjust the selected input image data by one level to diffuse quantization error, the at least seven colors including primary colors used as visible colors for forming an image on a recording medium, secondary colors that are complementary colors of the visible colors, and black.

10. A computer readable medium comprising a program that causes a computer to perform an image processing method according to claim 7.

* * * * *